Figure 1:
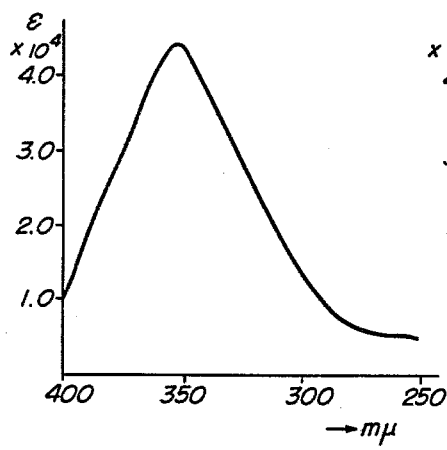

June 1, 1965  SHIGEYA SAIJO ETAL  3,187,027
METHOD OF PRODUCING VITAMIN A ACID ESTERS
Filed Sept. 7, 1961

INVENTORS
Shigeya Saijo
Kiyoshi Ohizumi
BY

Stevens, Davis, Miller & Mosher
ATTORNEYS

United States Patent Office 3,187,027
Patented June 1, 1965

3,187,027
METHOD OF PRODUCING VITAMIN A
ACID ESTERS
Shigeya Saijo, Nishinomiya-shi, and Kiyoshi Ohizumi, Ashiya-shi, Japan, assignors to Sumitomo Chemical Company, Ltd., Osaka, Japan, a corporation of Japan
Filed Sept. 7, 1961, Ser. No. 136,506
8 Claims. (Cl. 260—410.9)

This invention relates to a method of producing vitamin A acid esters. More particularly, it relates to a method for esterifying vitamin A acid by use of a novel esterification procedure.

As to the synthesis of vitamin A from vitamin A acid, a process wherein vitamin A acid is converted to its lower alkyl ester and the resulting ester is reduced to vitamin A using an active hydride, such as lithiumaluminum hydride, is considered the most advantageous at the present time. As to the method for producing lower alkyl esters of vitamin A acid from vitamin A acid, only the following two have so far been reported: One is a method wherein vitamin A acid is treated with diazomethane (cf. O. Schwarzkopf at al.: Helv. Chimica Acta, 32, 443–452 (1949)), and the other is a method wherein vitamin A acid is treated with an alkyl halide, an alkali metal carbonate, and using a ketone as solvent (cf. U.S. Patent No. 2,583,594 and C. D. Robeson et al.: Journal of the American Chemical Society, 77, 4111–4119 (1955)).

Generally speaking, the esterification reaction of vitamin A acid tends to cause shifting of the conjugated double bond system, thereby to cause an isomerization, in the course of the reaction, and to by-produce the retro-isomer besides the vitamin A acid esters. It is said, however, that the afore-mentioned two methods can yield a vitamin A acid ester substantially free from the retro-isomer.

However, these methods involve certain inherent difficulties. Namely, the former, the diazomethane method, is merely a laboratory process and could not be applicable to the commercial scale production, since the diazomethane is expensive and tends to cause explosion. The latter, the alkyl halide method, also has some troubles in that the esterification temperature is rather higher (for example, under the reflux condition of methyl ether ketone) and hence favors isomerization of the trans- to the cis-configuration.

The present inventors have found a more economical and easily practicable method of esterification of vitamin A acid excluding the formation of the retro-isomer and isomerization of the trans- to the cis-configuration, which comprises treating vitamin A acid with a di-(lower alkyl) sulfate and an alkaline compound selected from the group consisting of hydroxides, carbonates, and bicarbonates of alkali metals and alkali-earth metals, in a hydrocarbon solvent, and recovering the resulting lower alkyl ester of vitamin A acid from the hydrocarbon solvent.

Thus, an object of the invention is to provide a novel method for producing vitamin A acid esters, using economical and easily available reagents. Another object of the invention is to provide such method wherein the procedure is simplified and, besides, vitamin A acid esters of very high purity are obtained with almost quantitative yield. Other objects and advantages would be apparent from the following description.

The di-(lower alkyl) sulfates employed in the present invention are well known esterifying agents. Among those, dimethyl sulfate and diethyl sulfate are the most preferable.

The alkaline compounds employed in the present invention are hydroxides, carbonates, and bicarbonates of alkali metals and alkali-earth metals. As more preferable group, sodium hydroxide, potassium hydroxide, calcium hydroxide, sodium carbonate, potassium carbonate, sodium bicarbonate, and potassium bicarbonate may be mentioned.

In the present invention, the use of a hydrocarbon solvent is essential. The solvent should dissolve the resulting vitamin A acid ester, but it should have little solubility against water and dialkyl sulfate. The typical solvents to be employed in the invention include petroleum ether, petroleum benzine, benzene, toluene, xylene, n-hexane, cyclohexane, and the like.

In practicing the method of the invention, vitamin A acid is first treated with a di-(lower alkyl) sulfate and an alkaline compound as identified above, in a hydrocarbon solvent. The proportion of the amounts of the acid, the di-(lower alkyl) sulfate, and the alkaline compound may be varied widely, but it may be said that the di-(lower alkyl) sulfate and the alkali compound are employed in at least equimolar amount to the vitamin A acid. As the most advantageous procedure, and as the most characteristic feature of the invention, however, the di-(lower alkyl) sulfate is preferably used in a considerable excess of the amount, for example, in 2 to 8 times molar excess, more preferably in 4 to 6 times. Accordingly, the alkaline compound is preferably used in an excess corresponding to the above, for example in 1 to 4 times molar excess, more preferably in 1.5 to 3 times.

The hydrocarbon solvent may be employed in at least the same volume as that of the ester to be produced. More preferably, it may be employed in 5 to 100 times, still more preferably 5 to 20 times as much volume as that of the ester.

The esterification reaction may be effected by mixing the vitamin A acid, the di-(lower alkyl) sulfate, the alkaline compound, and the hydrocarbon solvent. The alkaline compound may advantageously be added in the form of an aqueous solution or suspension. The mixture may be well stirred at room temperature or at a temperature up to the boiling point of the solvent employed. However, it is advantageous to have a comparatively lower temperature within the range as above-mentioned, since the method of esterification of the present invention proceeds at such a lower temperature that the vitamin A acid and the resulting ester do not suffer from the formation of the retro-isomer and the isomerization from the trans- to the cis-isomer. Thus, a temperature of 30° to 60° C., more preferably 40° to 50° C., is the most advantageous in the esterification according to the invention.

As the more advantageous embodiment of the invention, a mixture of vitamin A acid, the di-(lower alkyl) sulfate, and the hydrocarbon solvent is first heated at a temperature as above-identified while being stirred, and the alkaline compound, preferably in the form of an aqueous solution, is added portionwise thereto.

Figure 2:
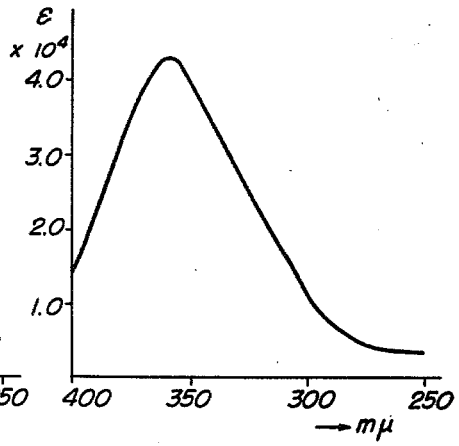

The esterification reaction of the invention proceeds in a heterogenous system. Thus, the hydrocarbon solvent employed serves at least for dissolution of the vitamin A acid ester as it is formed. Accordingly, the vitamin A acid esters produced according to the invention are substantially free from the retroisomer and can yield pure vitamin A by reduction with lithium-aluminum hydride. This fact will be seen from the drawings attached. When all-trans-vitamin A acid having the ultraviolet absorption spectrum shown in FIG. 1 is esterified according to the method of the invention, all-trans-vitamin A acid ester having the ultraviolet absorption spectrum shown in FIG. 2 is obtained, which can be converted, upon reduction with lithiumaluminum hydride, to all-trans-vitamin A having the ultraviolet absorption spectrum shown in FIG.

3. As clearly seen from these spectra, the retroisomers are not present. If a vitamin A acid having all-cis- or any other steric configuration is used as the raw material, a vitamin A acid ester having the corresponding configuration is obtained.

After termination of the esterification which is shown by disappearance of the undissolved vitamin A acid, the resulting ester is recovered from the hydrocarbon solvent. For this purpose, the hydrocarbon layer is separated, and, advantageously, washed with water, followed by drying. Evaporation of the hydrocarbon layer, preferably in vacuo, leaves the desired vitamin A acid ester. If desired, the excess of the di-(lower alkyl) sulfate is decomposed by addition of an alkaline compound prior to the separation of the hydrocarbon layer. Or alternatively, the di-(lower alkyl) sulfate layer containing the excess of said compound and separated from the hydrocarbon layer, is reused for the next esterification process.

Now the method of the invention will be explained with reference to the following examples, which however are provided merely by way of illustration and not by way of limitation.

Example 1

To a mixture of 9 g. of all-trans-vitamin A acid (melting at 180–181° C., having ultraviolet absorption maximum of 352.5 m$\mu$, $\epsilon$ 44,900, see FIG. 1) and 90 cc. of petroleum benzine, 22.7 g. of dimethyl sulfate is added. The mixture is heated to 40° to 45° C. while being stirred, to which is slowly dropped 25 cc. of aqueous 20% sodium hydroxide solution over 1.5 hours, whereby the vitamin A acid is dissolved. Then, additional 25 cc. of aqueous 20% sodium hydroxide solution is added thereto, and the mixture is stirred for 1 hour at 20° C. Thereafter, the petroleum benzine layer of the reaction mixture is separated, washed with water, dried over anhydrous sodium sulfate, and evaporated in vacuo to leave 9.4 g. of yellow methyl ester of all-trans-vitamin A acid. The ester crystallizes upon cooling, which melts at 69–72° C. and has ultraviolet absorption maximum of 357.5 m$\mu$, $\epsilon$ 43,800 (see FIG. 2).

Figure 3:
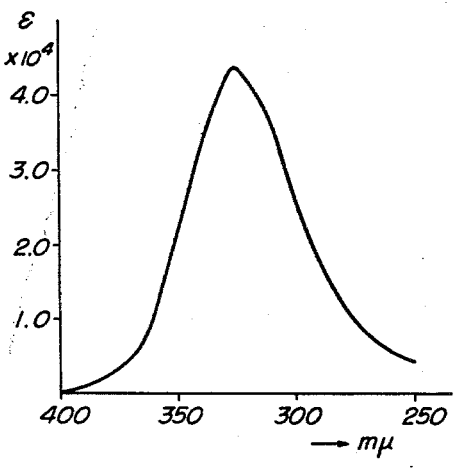

The methyl ester of all-trans-vitamin A acid can be converted to all-trans-vitamin A by reduction using lithiumaluminum hydride according to the conventional procedure (see FIG. 3).

Example 2

To a mixture of 9 g. of all-trans-vitamin A acid and 90 cc. of benzene, 22.7 g. of dimethyl sulfate is added, and the mixture is processed according to the same condition as in Example 1.

The vitamin A acid dissolves and is entered in the reaction after 1 hour. The reaction mixture is treated as in Example 1, to yield 9.3 g. of methyl ester of vitamin A acid (ultraviolet absorption maximum, 357.5 m$\mu$, $\epsilon$ 43,600).

Example 3

To a mixture of 3 g. of all-trans-vitamin A acid and 30 cc. of petroleum benzine, 9.3 g. of diethyl sulfate is added. The mixture is heated to 40° to 45° C. while being stirred, to which is slowly dropped 8.4 cc. of aqueous 20% sodium hydroxide solution over 1⅔ hours, whereby the vitamin A acid is dissolved. Then, additional 8.4 cc. of aqueous 20% sodium hydroxide solution is added thereto, and the mixture is stirred for 1 hour at 20° C. Thereafter, the petroleum benzine layer of the reaction mixture is separated, washed with water, dried over anhydrous sodium sulfate, and evaporated in vacuo to leave 3.3 g. of ethyl ester of all-trans-vitamin A acid, which has ultraviolet absorption maximum of 357.5 m$\mu$, $\epsilon$ 43,500.

Example 4

To a mixture of 3 g. of all-trans-vitamin A acid and 30 cc. of petroleum benzine, 7.6 g. of dimethyl sulfate is added. The mixture is heated to 40° to 50° C. with stirring, to which is slowly dropped 28.8 cc. of aqueous 20% potassium carbonate solution over 2 hours, whereby the vitamin A acid is dissolved. Then, additional 28.8 cc. of 20% potassium carbonate solution is added thereto, and the mixture is stirred for 1 hour at 20° C. Thereafter, the petroleum benzine layer of the reaction mixture is separated, washed with water, dried over anhydrous sodium sulfate, and evaporated in vacuo to leave 3.1 g. of yellow methyl ester of all-trans-vitamin A acid, which has ultraviolet absorption maximum of 357.5 m$\mu$, $\epsilon$ 43,600.

Example 5

To a mixture of 9 g. of vitamin A acid (all-trans-vitamin A acid containing 30% of 2-cis-vitamin A acid) and 90 cc. of n-hexane, 22.7 g. of dimethyl sulfate is added. The mixture is heated to 40° C. while being stirred, to which is slowly dropped 25 cc. of aqueous 20% sodium hydroxide solution over about 1 hour, whereby the vitamin A acid is dissolved. Then, additional 25 cc. of aqueous sodium hydroxide solution is added thereto, and the mixture is stirred for 1 hour at 20° C. Thereafter, the hexane solution layer is separated, washed with water, dried over anhydrous sodium sulfate, and evaporated in vacuo to leave 9.3 g. of methyl ester of vitamin A acid, which has ultraviolet absorption maximum of 359 m$\mu$, $\epsilon$ 42,800.

Example 6

To a mixture of 9 g. of all-trans-vitamin A acid and 90 cc. of n-hexane, 22.7 g. of dimethyl sulfate is added. The mixture is heated to 40° to 45° C. while being stirred, to which is slowly dropped 18.5 g. of calcium hydroxide suspended in 185 cc. of water over 3 hours. After additional 2 hours stirring at 20° C., the n-hexane layer is separated, washed with water, dried over anhydrous sodium sulfate, and evaporated in vacuo, to leave 9.3 g. of methyl ester of vitamin A acid, which has ultraviolet absorption maximum of 357 m$\mu$, $\epsilon$ 43,000.

We claim:

1. A method of producing vitamin A acid esters, which comprises reacting vitamin A acid with a di-(lower alkyl) sulfate and an alkaline compound selected from the group consisting of hydroxides, carbonates, and bicarbonates of alkali metals and alkali-earth metals, in a heterogeneous sytem including a hydrocarbon solvent, and recovering the resulting lower alkyl ester of vitamin A acid from the hydrocarbon solvent.

2. A method according to the claim 1, wherein the di-(lower alkyl )sulfate is dimethyl sulfate.

3. A method according to the claim 1, wherein the di-(lower alkyl) sulfate is diethyl sulfate.

4. A method according to the claim 1, wherein the alkaline compound is used in the form of an aqueous solution.

5. In the method of producing vitamin A acid esters by esterification of vitamin A acid, the improvement which comprises reacting said vitamin A acid with a di-(lower alkyl) sulfate and an alkaline compound in a heterogeneous system including a hydrocarbon solvent.

6. A method of producing vitamin A acid esters, which comprises reacting vitamin A acid with 2 to 8 times molar excess amount of a di-(lower alkyl) sulfate and 1 to 4 times molar excess amount of an alkaline compound, in 5 to 100 times the volume of a hydrocarbon solvent, over the amount of the vitamin A acid ester produced, said alkaline compound being selected from the group consisting of hydroxides, carbonates, and bicarbonates of alkali metals and alkali-earth metals; and recovering the resulting lower alkyl ester of vitamin A acid from the hydrocarbon solvent.

7. A method according to the claim 6, wherein the treatment of the vitamin A acid with the di-(lower alkyl) sulfate and the alkaline compound in the hydrocarbon solvent is conducted at a temperature of 30° to 60° C.

8. A method of producing vitamin A acid esters, which comprises slowly adding an aqueous alkaline compound mixture to a mixture of vitamin A acid, a di-(lower alkyl)

sulfate, and a hydrocarbon solvent at a temperature of 30° to 60° C., while being stirred, and, thereafter, recovering the lower alkyl ester of vitamin A acid from the hydrocarbon solvent.

References Cited by the Examiner
UNITED STATES PATENTS
2,583,594  1/52  Robeson _____ 260—410.9

FOREIGN PATENTS
660,368  11/51  Great Britain.

OTHER REFERENCES

Houben-Weyl: Methoden der organischen Chemie, Band VIII (Stuttgart, 1952), pp. 541–3.

Migridichian: Organic Synthesis, I (New York, 1957), pp. 326–7.

Schwarzkopf et al.: Helv. Chim. Acta, vol. 32, pp. 443–452 (1949).

LORRAINE A. WEINBERGER, *Primary Examiner.*

IRVING MARCUS DUVAL McCLUTCHEN,
*Examiners.*